(12) United States Patent
Gorny (10) Patent No.: US 11,663,606 B2
(45) Date of Patent: May 30, 2023

(54) COMMUNICATIONS PLATFORM SYSTEM

(71) Applicant: Nextiva, Inc., Scottsdale, AZ (US)

(72) Inventor: Tomas Gorny, Scottsdale, AZ (US)

(73) Assignee: Nextiva, Inc., Scottsdale, AZ (US)

( * ) Notice: Subject to any disclaimer, the term of this patent is extended or adjusted under 35 U.S.C. 154(b) by 353 days.

(21) Appl. No.: 17/086,851

(22) Filed: Nov. 2, 2020

(65) Prior Publication Data

US 2021/0049615 A1 Feb. 18, 2021

Related U.S. Application Data (63) Continuation of application No. 16/167,981, filed on Oct. 23, 2018, now Pat. No. 10,839,399, which is a continuation-in-part of application No. 15/651,372, filed on Jul. 17, 2017, now Pat. No. 10,296,915, which is a continuation of application No. 14/485,626, filed on Sep. 12, 2014, now Pat. No. 9,710,814.

(51) Int. Cl.
*G06F 16/28* (2019.01)
*G06Q 30/01* (2023.01)

(52) U.S. Cl.
CPC .................................. *G06Q 30/01* (2013.01)

(58) Field of Classification Search
CPC .............................. G06Q 30/01; G06F 16/28
See application file for complete search history.

(56) References Cited

U.S. PATENT DOCUMENTS

2010/0094710 A1* 4/2010 Ramakrishna ..... G06Q 30/0251
709/213

* cited by examiner

*Primary Examiner* — Truong V Vo
(74) *Attorney, Agent, or Firm* — Spencer Fane LLP; Steven J. Laureanti (57) ABSTRACT

A system and method are disclosed and include databases that store data describing electronic communication between one or more user devices and one or more company devices and a computer. The computer displays a graphical user interface for monitoring communication activity of one or more one or more user devices and one or more company devices, to one or more company devices and monitors communication activity over one or more communication channels. The computer also records and stores the communication activity in the databases. The computer further displays a list of rules, the list of rules comprising triggers, conditions and actions for each of the one or more rules and a flow of each rule associated with the company of the one or more company devices and executes one or more actions responsive to one or more triggers, conditions or actions of each of the one or more rules.

20 Claims, 5 Drawing Sheets

COMMUNICATIONS PLATFORM SYSTEM

CROSS-REFERENCE TO RELATED APPLICATIONS

This application is a continuation of U.S. patent application Ser. No. 16/167,981, filed on Oct. 23, 2018, entitled "Customer Management System," which is a continuation-in-part of U.S. patent application Ser. No. 15/651,372, filed on Jul. 17, 2017, entitled "Customer Management System", now U.S. Pat. No. 10,296,915, which is a continuation of U.S. patent application Ser. No. 14/485,626, filed on Sep. 12, 2014, entitled "Customer Management System", now U.S. Pat. No. 9,710,814. This application also claims the benefit under 35 U.S.C. § 119(e) to U.S. Provisional Application No. 62/575,609, filed Oct. 23, 2017, and entitled "Communications Platform System." The subject matter disclosed in U.S. patent application Ser. No. 16/167,981, U.S. Pat. Nos. 10,296,915 and 9,710,814, and U.S. Provisional Application No. 62/575,609 is hereby incorporated by reference into the present disclosure as if fully set forth herein.

TECHNICAL FIELD

The present disclosure relates generally to a system and method of customer communications and interactions and specifically to a communications platform system.

BACKGROUND

With the increasing complexity of customer relationships and mounting pressure to provide outstanding customer service, companies are struggling to meet their customers' expectations. Customer relationships naturally evolve over time, however, challenges arise when companies use multiple applications and systems to organize and view customer relationship data, or when data is complicated by duplicate or outdated information. As a result, most companies are unable to achieve a complete view of each customer and their history. This means companies are hearing from customers more, but understanding less. It's important that multiple data sets can be seamlessly accessed and organized in one dashboard or user interface in order to maintain a holistic view of each customer. Without a solution, these problems can lead to a degraded customer experience, causing dissatisfied customers. Therefore, previous techniques of attempting to achieve a single view of the customer have proven inadequate.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, aspects of the following disclosure relate to the communication and interactions between companies and customers. According to one aspect, embodiments provide for an enterprise level system that assures data integrity in a non-siloed cloud datastore and leverages the information stored in the cloud datastore for analytical purposes. For example, a rules engine, in the analytical system, leverages machine learning, natural language processing and artificial intelligence to understand and predict customers and users' behavior. According to a second aspect, the cloud datastore provides for data integrity and the ability for companies to achieve full transparency between customers and company team members. As an example only and not by way of limitation, a company may leverage a rules engine to automate tasks and processes to assure operational consistency, such as, case management, scheduling, user management, permission management, role settings and the like. In addition, or as an alternative, a company may capture sentiments such as a customer's likelihood of recommending products or services and the customer's overall satisfaction, which trigger marketing and service strategies of the company.

Figure 1:
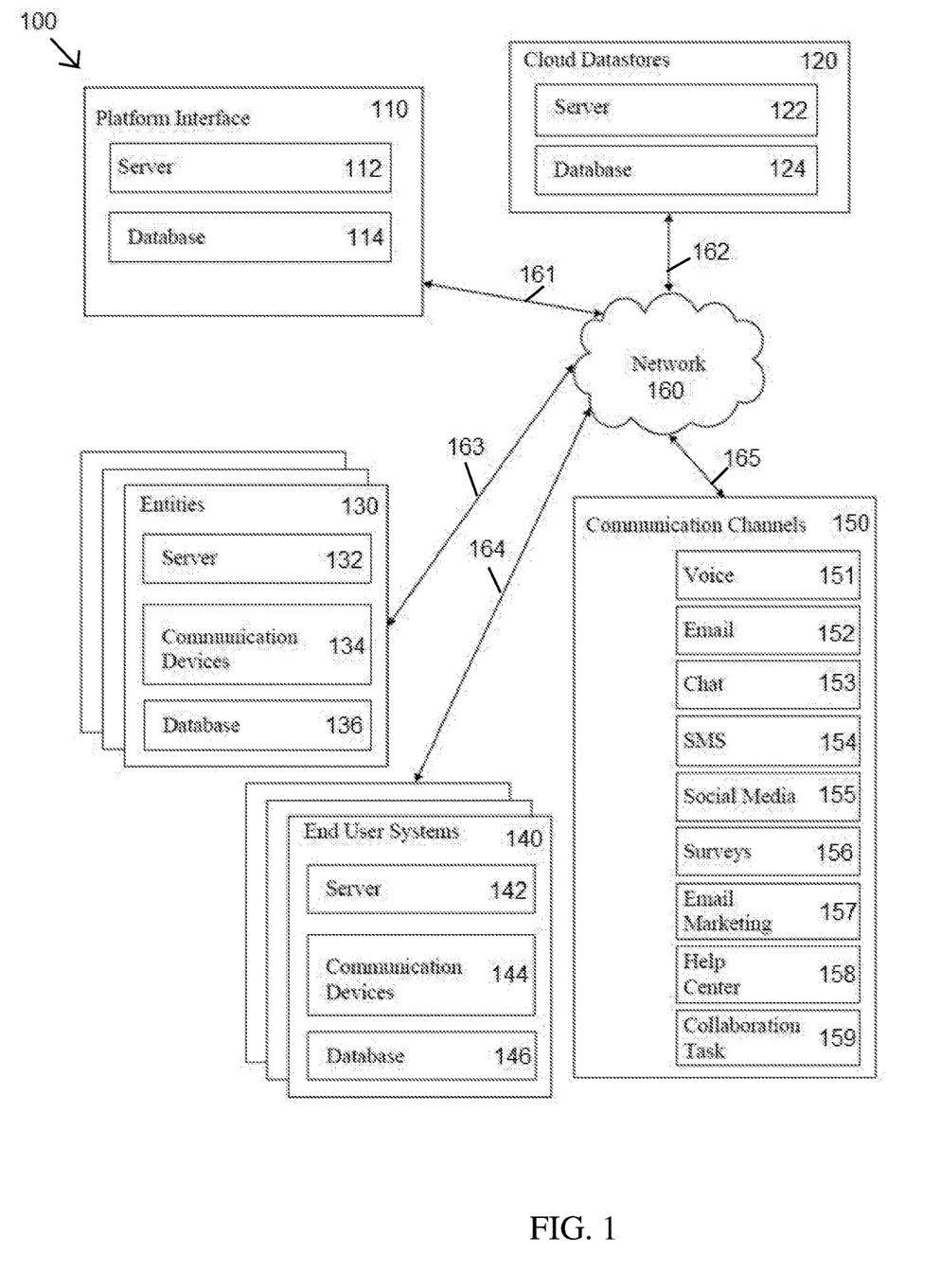
FIG. 1 illustrates an exemplary system according to a first embodiment.

FIG. 1 illustrates an exemplary system 100, according to a first embodiment. System 100 comprises platform interface 110, cloud datastore 120, one or more entities 130, one or more end user systems 140, communication channels 150, a network 160, and communication links 161-165. Although platform interface 110, cloud datastore 120, one or more entities 130, one or more end user systems 140, communication channels 150, a single network 160, and communication links 161-165 are shown and described, embodiments contemplate any number of platform interfaces, cloud datastores, entities, end user systems, communication channels, networks, or communication links, according to particular needs.

In one embodiment, platform interface 110 comprises server 112 and database 114. The server is programmed to communicate and interact with cloud datastore 120, one or more entities 130 and one or more end user systems 140 and provide data integrity which allows full transparency between one or more entities 130 and one or more end user systems 140 to create a single view of customer account and relevant information, as discussed below in more detail. Database 114 comprises one or more databases or other data storage arrangements at one or more locations, local to, or remote from, platform interface 110. In one embodiment, one or more databases is coupled with one or more servers using one or more local area networks (LANs), metropolitan area networks (MANs), wide area networks (WANs), network 160, such as, for example, the Internet, or any other appropriate wire line, wireless, or any other communication links. One or more databases stores data that is made available and may be used by one or more servers, according to the operation of system 100.

In another embodiment, cloud datastore 120 comprises server 122 and database 124. Cloud datastore 120 provides a centralized datastore for one or more entities 130, such that, the data uploaded to cloud datastore 120 is segregated and secure for each particular entity 130. In addition, ore as an alternative, cloud datastore 120 provides shared computer processing resources and data according to the operation of system 100. As discussed below in more detail, platform interface 110 may be located internal or local to cloud datastore 120, according to particular needs. Server 122 comprises any server or computer system configured to access, update and provide data associated with one or more entities 130 and/or one or more end user systems 140, as discussed below in greater detail.

Database 124 comprises one or more databases or other data storage arrangements at one or more locations, local to, or remote from, platform interface 110. In one embodiment, one or more databases is coupled with one or more servers using one or more LANs, WANs, MANs, network 160, such as, for example, the Internet, or any other appropriate wire line, wireless, or any other communication links. The one or more databases stores data that is made available and may be used by one or more servers according to the operation of system 100.

In an embodiment, one or more entities 130 may be any entity, such as, for example, a business, company, enterprise, retailer, call-center, customer service system, help desk system, telephone or media service, or any entity which communicates with customers, either its own customers or the customers of another entity. One or more entities 130 comprise one or more servers 132, one or more communication devices 134 and one or more databases 136 or other data storage arrangements at one or more locations which are integral to or separate from the hardware and/or software that supports system 100. As discussed in more detail below, each communication device 134 provides one or more entities 130 a channel of communication via communication channels 150 between end user systems 140 and entities 130. One or more entities 130 are coupled to one or more end user systems 140 via communication channels 150 by network 160 via communication links 163 and 164.

In one embodiment, one or more end user systems 140 comprises an end user system such as, for example, a business partner, vendor, business customer, an online or in-store customer, a member of an organization, an individual or group of individuals or the like. One or more end user systems 140 comprises server 142, communication devices 144 and database 146. Each communication device 144 provides one or more end user systems 140 a channel of communication via communication channels 150 between one or more entities 130 and one or more end user systems 140. One or more end user systems 140 are coupled to one or more entities 130 via communication channels 150 by network 160 via communication links 163, 164 and 165.

In embodiments, communication channels 150 comprises channels of communication such as, for example, voice 151, email 152, chat 153, SMS 154, social media 155, surveys 156, email marketing 157, help center 158, and collaboration task management 159. These communication channels 150 may leverage third party products or services, such as for example, social media platforms, email systems, or the like. In addition, or as an alternative, embodiments contemplate integrating APIs, where for example, third-party products may be integrated into the backend or communication interface of platform interface 110. Although one or more channels of communication are shown and described, embodiments contemplate any number or any type of communication channels, according to particular needs.

As discussed in more detail below, one or more entities 130 may communicate with or receive communication from one or more end user systems 140 or any other third party entity using communication channels 150. This communication may be, for example, telephone calls, emails, instant, chat or text messaging, posting to social media, blogs, or newsgroups, and any other communication activity of communication channels 150.

Platform interface 110 including server 112 and database 114 are coupled with network 160 using communications link 161, which may be any wireline, wireless, or other link suitable to support data communications between platform interface 110 and network 160. Cloud datastore 120 including server 122 and database 124 are coupled with network 160 using communications link 162, which may be any wireline, wireless, or other link suitable to support data communications between cloud datastore 120 and network 160. One or more entities 130 including server 132 and database 134 are coupled with network 160 using communications link 163, which may be any wireless or other link suitable to support data communications between one or more entities 130 and network 160. One or more end user systems 140 is coupled with network 160 using communications link 140, which may be any wireline, wireless, or other link suitable to support data communications between one or more end user systems 140 and network 160. Communication channels 150 is coupled with network 160 using communications link 150, which may be any wireline, wireless, or other link suitable to support data communications between the communication channels 150 and network 160.

Although the communication links 161-165 are shown as generally coupling platform interface 110, cloud datastore 120, one or more entities 130, one or more end user systems 140, and communication channels 150, with network 160, platform interface 110, cloud datastore 120, one or more entities 130, one or more end user systems 140, and communication channels 150 may communicate directly with each other according to particular needs.

In an embodiment, network 160 includes the Internet, telephone lines, any appropriate local area networks LANs, MANs, or WANs, and any other communication network coupling platform interface 110, cloud datastore 120, one or more entities 130, one or more end user systems 140, communication channels 150. For example, data may be maintained by platform interface 110 or cloud datastore 120 at one or more locations external to platform interface 110 and/or cloud datastore 120 and made available to platform interface 110, cloud datastore 120, one or more entities 130, one or more end user systems 140, and communication channels 150, using network 160 or in any other appropriate manner. Those skilled in the art will recognize that the complete structure and operation of the communication network and other components within system 100 are not depicted or described. Embodiments may be employed in conjunction with known communications networks and other components.

In one embodiment, platform interface 110, cloud datastore 120, one or more entities 130, one or more end user systems 140, and/or communication channels 150, may each operate on one or more computers or computer systems that are integral to or separate from the hardware and/or software that support system 100. In addition or as an alternative, one or more users, such as entities or end users, may be associated with system 100 including platform interface 110, cloud datastore 120, one or more entities 130, one or more end user systems 140, and/or communication channels 150.

These one or more users may include, for example, one or more computers programmed to seamlessly manage customer communication from multiple channels and/or one or more related tasks within system 100. According to embodiments, a user may access information from multiple channels that is automatically funneled into the same place i.e., the cloud datastore, making managing customers and operations easier than ever before. For example, when a telephone call comes into system 100, that user may view chat transcripts and easily sift through real time email correspondence to ensure the highest quality and speed of service for their customers.

As used herein, the term "computer" or "computer system" includes any suitable input device, such as a keypad, mouse, touch screen, microphone, or other device to input information. Any suitable output device that may convey information associated with the operation of system 100, including digital or analog data, visual information, or audio information. Furthermore, the computer includes any suitable fixed or removable non-transitory computer-readable storage media, such as magnetic computer disks, CD-ROM, or other suitable media to receive output from and provide input to system 100. The computer also includes one or more processors and associated memory to execute instructions and manipulate information according to the operation of system 100.

In one embodiment and as discussed in more detail below, system 100 provides a shared communications platform system. That is, system 100 comprises platform interface 110, cloud datastore 120, one or more entities 130, one or more end user systems 140, and/or communication channels 150, which allows full transparency between one or more entities 130 and one or more end user systems 140 to create a single view of the end user system 140 account and relevant information via cloud datastore 120. In addition, or as an alternative, system 100 functions as an enterprise solution that provides flexibility for one or more entities 130 to setup and determine processes around their corporate needs related to the interactions between an entity 130 and customers using end user system 140 over various communication channels 150. Accordingly, system 100 provides one or more entities 130 a system and method for capturing, identifying and automating a customer's communications and interactions with the entity 130 in a single place i.e., the cloud datastores 120, as described in more detail below.

Figure 2:
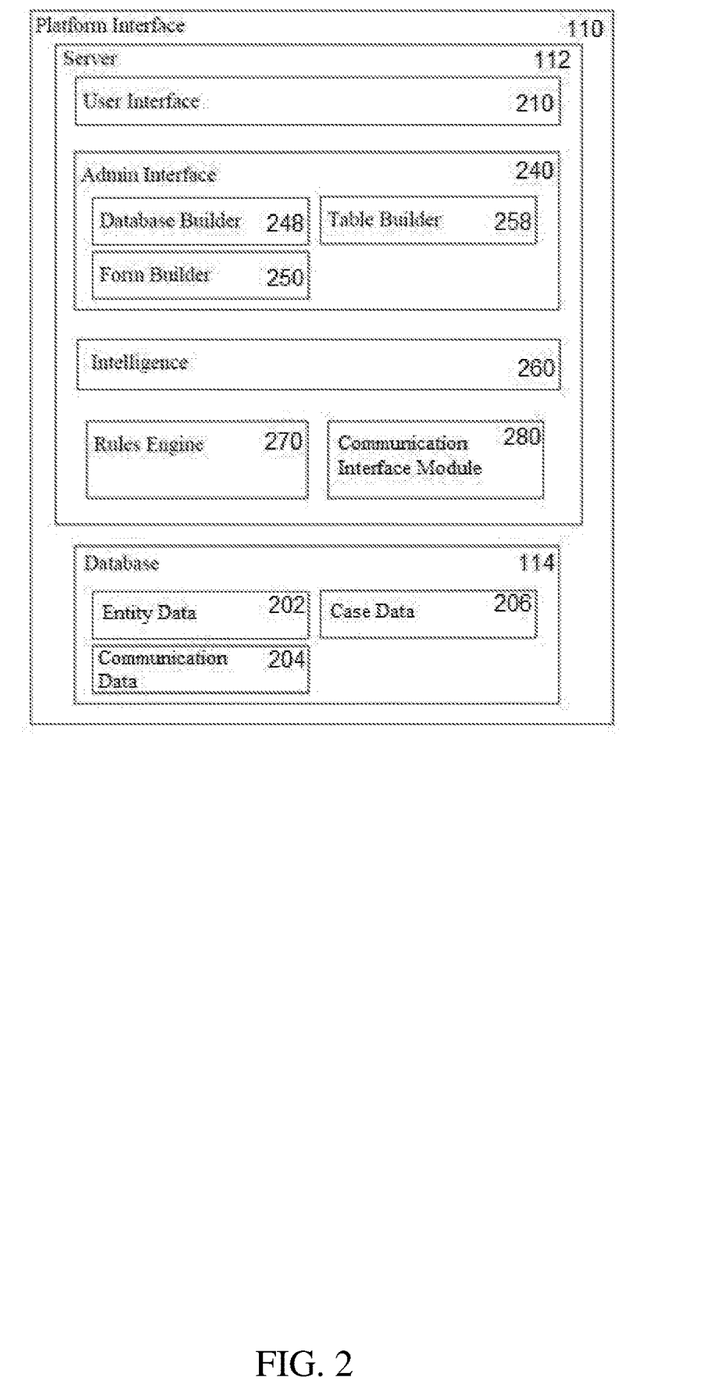
FIG. 2 illustrates the platform interface of FIG. 1 according to an embodiment.

FIG. 2 illustrates platform interface 110 of FIG. 1 in greater detail according to an embodiment. As discussed above, platform interface 110 comprises one or more computers at one or more locations including associated input devices, output devices, non-transitory computer-readable storage media, processors, memory, or other components for configuring, managing, and providing communications according to the operation of system 100. In addition, and as discussed in more detail below, platform interface 110 comprises server 112 and database 114. Although platform interface 110 is shown and described as comprising a single computer, server 112 and database 114; embodiments contemplate any suitable number of computers, servers or databases internal to or externally coupled with platform interface 110. In addition, or as an alternative, platform interface 110 may be located internal to one or more entities 130. In other embodiments, platform interface 110 may be located external to one or more entities 130 and may be located in, for example, cloud datastore 120, according to particular needs.

Server 112 of platform interface 110 comprises user interface module 210, administrator interface module 240, intelligence module 260, rules engine 270, and communication interface module 280. Database 114 of platform interface 110 comprises entity data 202, communication data 204 and case data 206. Although, the user interface module, administrator interface module, intelligence module, rules engine, communication interface module, entity data, communication data and case data are shown and described; embodiments contemplate any type of data and any number of modules or engines, according to particular needs.

User interface module 210 of server 112 of platform interface 110 provides services to configure the operation of system 100 and change which modules are executed and/or data is stored on one or more of platform interfaces 110, cloud datastores 120, one or more entities 130, and/or one or more end user systems 140. According to embodiments user interface module 210 generates a graphical user interface, described in more detail below, for configuring, monitoring, and interpreting communication channels 150 and communication activity of communication devices 134 of one or more entities 130 and communication devices 144 of one or more end user systems 140. According to embodiments, various features of user interface module 210 include generating charts, storing and retrieving communication data 204, displaying notifications, and creating and managing reports. In addition, user interface module 210 retrieves data from database 114 including entity data 202, communication data 204, and case data 206 and manages, sorts, and displays the data. Embodiments contemplate a highly user-configurable system, such that the various modules or data may be stored either singularly or redundantly on database 114 and/or cloud datastore 120, according to particular needs.

According to embodiments, user interface module 210 also provides the creation and setup of different types of users and assigns multiple different types of permissions to those users based on their roles within one or more entities 130. For example, on the customer service side, user interface module 210 provides for multiple types of users such as, for example, account managers, support agents, sales agents, onboarding specialists, and the like. According to embodiments, these users are provided access to the agent section of the user interface within an agents section, such that, the users would have access to different tools such as, for example, internal and external chat, case creation and modification, calendaring and task management, multi-channel communication including voice, email and chat and agent side analytics.

According to embodiments, the internal and external chat allows an agent to talk to either other agents of one or more entities 130 or to external customers, such as, one or more end user systems 140. Calendaring allows an agent to create and schedule relevant tasks or activities and specify the necessary details on those activities such as recipients, date/time/location, and the like. Multi-channel communication ensures seamless communication with one or more end user systems 140, such as, for example, voice by using call-pop, which triggers an incoming call to pop-up on the agent's computer display screen. In addition, or as an alternative, if the phone number finds a match with an existing case, account or contact in system 100, the details are populated on the call pop-up screen such that the agent knows who is calling. Once the call is complete, platform interface 110 causes the call transcript to be transcribed as an interaction on either a new case or an existing case.

In addition, embodiments provide for additional channels of communication such as, email and chat. For example, when an email or chat comes into system 100, platform interface 110 either creates a new case or automatically associates it to an existing case. In addition, every inbound email becomes an interaction on a case and at the end of a chat, the chat transcript is also made an interaction on the particular case. According to embodiments, any user on the agent side will also have access to agent side analytics that provides the user the sentiment, the account experience scores and the survey scores. Using the combination of these three analytics reports, the user may quickly detect the sentiment of the customers associated with the one or more end user systems 140 and is able to proactively formulate responses for any dissatisfied customers.

According to embodiments, user interface module 210 also provides access to surveys and email marketing. According to embodiments, surveys allow a marketer of one or more entities 130 to design, create and manage surveys to obtain relevant feedback from one or more end user systems 140. Email marketing provides the marketer several tools to design, create and send out emails over communication channels 150 pertaining to marketing campaigns. In addition, or as an alternative, user interface module 210 provides for one or more macros that allow a user to automate and increase the efficiency of communication with one or more end user systems 140. For example, the macros enable a user to pre-write and store templated questions and responses along with pre-set form field settings. According to embodiments, these pre-set templates may be accessed to ensure responses to common requests are fast and consistent. In addition, for added efficiency, rules may be used to trigger macros automatically, so common requests and repetitive tasks completely disappear from the user's to-do list.

According to embodiments, new macros may either be created by setting an appropriate form field setting and also populating the required predefined text either as a note or as an email. For example, if an administrator is creating a macro, the macro may designate to be either visible only to the administrator or for all agents. In addition, if an agent is creating a macro, the agent may only designate the macro to be visible to the agent. Once a Macro is created, the macro may be retrieved at any time using a macros option. Selecting this brings up a list of existing macros associated with one or more entities 130, which an agent has access to view. The agent may select any of the existing macros to apply the specific form field settings as well as populate the predefined email or note template that was created as part of the macro creation.

Administration interface 240 of server 112 of platform interface 110 comprises database builder 248, form builder 250 and table builder 258. According to embodiments, administration interface 240 allows the configuration of settings to present the data to the agents in an appropriate and relevant manner, as well as providing access to applications to enhance the customer experience of using platform interface 110. For example, administration interface 240 may provide one or more system services to setup or configure the operation of system 100, such as, user management, scheduling, setup, permission management, teams, configurations, controlling execution of modules and storage of data, including controlling the location of the storage of data. This may include setting up a telephone system or VOIP system to be monitored by administration interface 240 and configuring the type of communication activity that will be monitored over communication channels 150 and what communication data 204 will be collected and stored.

In addition, administration interface 240 provides two graphical user interface views, an agent view and an administration view. The agent view is used by one or more entities 130, such as, for example, agents or users who are actively providing customer relationship management and support to their customers. The administration view is used by administrators to configure the agent's view via different settings and available applications in order to present the information to the agent. According to embodiments, the agent view comprises list views as well as form and relationship views.

The list view provides a list of all the available instances of the entity 130 that the user is viewing, such as, for example, a list of accounts, contacts, cases, locations, and the like. In addition, selecting the list view will open that specific instance of the entity 130. Additionally, all of the entities 130 available to platform interface 110 for the agent to use, will be displayed. In addition, or as an alternative, once an instance of an entity 130 (for a specific case or a specific contact) has been selected, the view switches to the form and relationship view. In an exemplary embodiment, the relationship panel shows all the relationships that have been configured for this entity 130 and all the form fields available for this entity 130.

According to embodiments, the administration view is the section for the administrator to configure all the elements of platform interface 110, so that the agents and/or users are presented with the information in the most relevant manner possible. In addition, the administration view comprises several sub-sections such as, for example, user management, channels, smart topics and analytics, rules engine, engagement, case management and data management. Each of one these sub-sections enable the user to perform specific tasks. For example, the user management allows the administrator to create and manage users as well as assign roles and permissions. The data management allows users to manipulate the data in system 100 through multiple applications such as database 114, form builder 250 and table builder 258. The case management enables managing certain aspects of cases such as status and priority management. The tools and settings provide advanced security options to the user such as, for example, an IP blacklist and email blacklist.

In embodiments, Database builder 248 allows administrators to setup the database schema and tables as per the specific needs of a customer. For example, database builder 248 allows the administrator to create new database entities and/or tables, add/edit the fields in these database tables, and also add/edit relationships between multiple database tables. That is, embodiments allow the database schema to be created and designed using database builder 248.

In addition, or as an alternative, database builder 248 allows performing specific actions such as, for example, setting fields as unique or required, setting a field as a primary display field, and also being able to support all the common field types needed to represent the data such as number, text, currency, date, and the like. As an example only and not by way of limitation, database builder 248 provides the ability to create relationships between different entities and/or tables. These relationships may be of multiple cardinalities such as a one to one (1:1) or many to one (M:1) or a many to many (M:M) relationship. In addition, this may be between different entities 130 or may be within the same entity 130, such as, for example, when a case has a relationship to itself to represent parent cases and sub-cases.

According to embodiments, form builder 250 and table builder 258 allow administration users of one or more entities 130 to configure various views based on conditions of each audience within a company, such as, for example, a department, a team, a status or individuals. Form builder 250 determines data fields within cloud datastore 120 available for viewing based on predefined conditions, such as, for example, which department or individual is viewing the customer. Form builder 250 allows for the flexibility of platform interface 110 to design forms based on status such as, for example, active or non-active customers including pre-sale forms that provide status such as, for example, lead, quote, sales, account, or the like. Table builder 258 determines which fields may be viewed in a table view based on the same principles as described above.

In addition, or as an alternative, administration interface 240 of platform interface 110 allows for forms to be created for specific conditions, such as, for example, departments. As described below in more detail and at the time of the form creation, the administration users may pick and choose the conditions to be associated with the form, such as, for example, case departments. By doing this, this ensures that only people in those departments will be privy to see the form specific to their department. According to embodiments, multiple forms may be created for the same entity 130, and each of the multiple forms may have different fields specific to the conditions they are being created for.

According to embodiments, table builder 258 allows the administrator to configure a grid or list view or table view, which allows the administrator to select particular columns to be displayed for agents for that grid. In addition, this enables the administrator to not only select the columns that are native to the entity for which the grid is being constructed but also enables selection of columns that represent relationships of this entity to other entities. For example, these may be single level or multi-level relationships, thus allowing the user to see relevant fields of related entities also at a glance in the grid of the primary entity.

In addition, and as discussed above with respect to the agent view of the graphical user interface views of administration interface 240, the administration view may also have multiple types of users such as, for example, administrators, operational managers and the like. These users may also have access to different tools in the administration view such as an administration dashboard, database builder 248, form builder 250, table builder 258, rules engine 270, administration analytics and gamification.

According to embodiments, the administration dashboard provides administration side users a quick view of the administration user and provides a segway to different sections such as smart topics, cloud datastores 120, rules engine 270 and data migration. Smart topics allow a user to create and configure topics on the backend as needed, including assigning topic points and SLA times for cases associated with the topic. In addition, or as an alternative, the smart topics provides a powerful suggestion tool for the agents. For example, every time a topic is created, the natural language processing engine of intelligence module 260 stores that topic and the relevant information. Thereafter, if a case is created that has similar information to the one previously created, platform interface 110 will automatically suggest topics for the user to be able to correctly represent the topic of a case.

In addition, the administration dashboard also provides a high-level view of administration side analytics. The database builder 248, form builder 250, and table builder 258 allow an administrator to manipulate the database schema and create forms and tables for specific entities 130 based on conditions, such as, for example, departments. In addition, and as discussed below, rules engine 270 allows an administrator to setup business rules to automate tasks and also provide appropriate notifications, according to particular needs. The administration analytics provides a complete view by conditions, such as departments of all the relevant data such as open cases and split of the cases by communication channels 150. Gamification is a sub-section under analytics which facilitates an administrator to not only do a comparison of different users but also allows the administrator to setup games/targets to use a motivational tool to increase user performance.

Intelligence module 260 of server 112 of platform interface 110 comprises natural language processing (NLP), prediction analysis, machine learning and smart reporting. According to embodiments, intelligence module 260 provides natural language processing such as, for example, transcribing an email, voice (call recording) or chat and performing the transcription to look for specific keywords in order to identify the sentiment of a conversation. In addition, or as an alternative, intelligence module 260 creates reports based upon those keywords, such as, how many times a word was used in a communication, a day, during a case and the like. In addition, intelligence module 260 uses machine learning to perform topic prediction, based on, for example, previously categorized cases. As an example only and not by way of limitation, if case A is set to be a topic of a new customer, and intelligence module 260 compares all of the cases in database 114 and/or database 124 of cloud datastores 120 to determine if a new case is consistent with a previous case, based on a predetermined threshold, such as, for example, 75% or 95%.

Rules engine 270 of server 112 of platform interface 110 enables administrators to setup business rules in order to automate several tasks and also take automatic action upon timed triggers being executed. According to embodiments, rules engine 270 may be accessed from administration interface 240 and comprises three elements—trigger, conditions and actions. The trigger refers to an event that happens which results in relevant conditions and actions being executed. The trigger may either start on a particular event or start at a particular period of time, such as, a particular date and/or a particular time. In addition, based on the trigger, multiple conditions may be setup to be evaluated. According to embodiments, a condition comprises an entity, an operator and a value. In addition, there may be multiple condition statements within a single condition, and multiple conditional blocks within a single condition, in order to construct simple and complex conditions.

In an embodiment, rules engine 270 provides a list of all the rules currently in system 100, the editing of triggers, conditions and actions, and shows the flow of the rule with the elements and branches as constructed by a user. In addition, an action is the task that needs to be performed upon the successful completion of a condition or conditions. For example, a create/update action will result in entities 130 being created or updated based on the relevant conditions and a notification action that results in a notification being sent out upon the successful evaluation of a condition/ conditions. As an example only and not by way of limitation, the notification may be an email notification, an in-app web notification, an SMS notification, or the like.

Communication interface module 280 of server 112 of platform interface 110 generates, receives, and monitors communication between one or more entities 130 and one or more end user systems 140. Communication interface module 280 may comprise one or more telephone systems, instant messaging systems, voice over internet protocol (VOIP) systems, email systems, internet or web-based chat systems, and/or other types of communication systems used for allowing each of one or more entities 130 to communicate with each other and/or one or more end user systems 140. Communication interface module 280 may comprise or couple with a communication system, which initiates or receives communication activity over communication channels 150 to communication devices 134 of one or more entities 130 and/or communication devices 144 of one or more end user systems 140. For example, communication interface module 280 may comprise a software-based telephone system that automatically records communication activity that occurs over communication devices within system 100. This may include recording the time, duration, date, voice, text, and other communication activity transmitted over various communication channels. Although described as a software-based telephone system, communication interface module 280 may comprise any suitable hardware or software that monitors and records any communication activity in system 100, according to particular needs. In some embodiments, the communication activity recorded by communication interface module 280 is stored in communication data 204, database 114 and/or cloud datastores 120.

Entity data 202 stored on database 114 of platform interface 110 describes the identification information of one or more entities 130 of system 100. Entity data 202 comprises any suitable identification information and may comprise, for example, names, addresses, company, telephone numbers, email, IP addresses, and the like. Entity data 202 may be used by platform interface 110 to identify one or more entities 130 to generate particular configurations of system 100 specific to each of the one or more entities 130. For example, where one or more entities 130 comprises departments, call groups, users, locations, agents, employee roles, or telephone numbers, the identification information stored in entity data 202 permits platform interface 110 to report, chart, graph, or identify tends or goals specific to the identified or selected departments, call groups, users, locations, agents, employee roles, or telephone numbers, according to particular needs.

Communication data 204 stored on database 114 of platform interface 110 may comprise communication activity of communication devices 134 of one or more entities 130 and any setup information of communication interface module 280. According to some embodiments, communication data 204 comprises the particular communication channels 150, which are open to entities 130, a particular end user system 140, the times, which communication channels 150 are open, the protocols or metadata that describe the communication, and/or any other configuration and setup data necessary to configure the communication systems. According to some embodiments, communication data 204 comprises information about each communication, such as, for example, which entity 130, end user system 140n, or user, from which the communication originated and/or to whom the communication was placed or transferred. Platform interface 110 may automatically collect data with every communication activity, and associate a time stamp with each action. In addition, each user or communication may be associated with a role, entity, end user system, department, call group, location, agent, or telephone number. A role may comprise, for example, a job, position, employment status, or the like.

Case data 206 stored on database 114 of platform interface 110 may comprise data generated by one or more entities 130 and/or one or more end user systems 140. In one embodiment, case data 206 includes, but is not limited to: an identity of the representative of entities 130 which created the case, end user systems 140 or a company to which the case relates, the channel by which a user contacted the representative of one or more entities 130, the number of contacts between one or more end user systems 140 and one or more entities 130, the total time spent by end user systems 140 on each channel, the time and date of the case creation, a topic and information shared during the contact between one or more entities 130 and one or more user systems 140, the content of the communication, and/or the like.

Figure 3A:
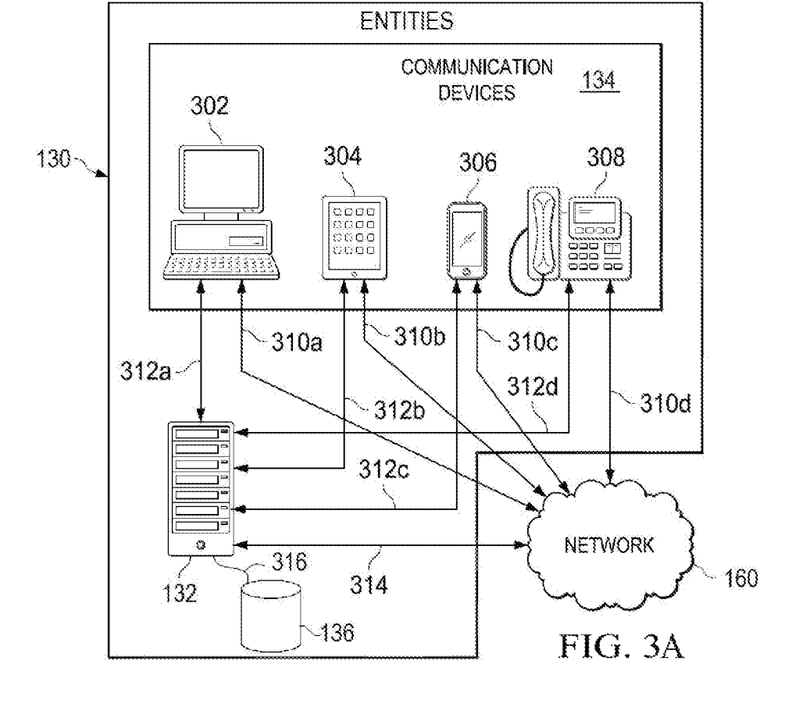
FIGS. 3A and 3B illustrate the communication devices of the one or more entities and the one or more end user systems of FIG. 1 in greater detail according to an embodiment.
Figure 3B:
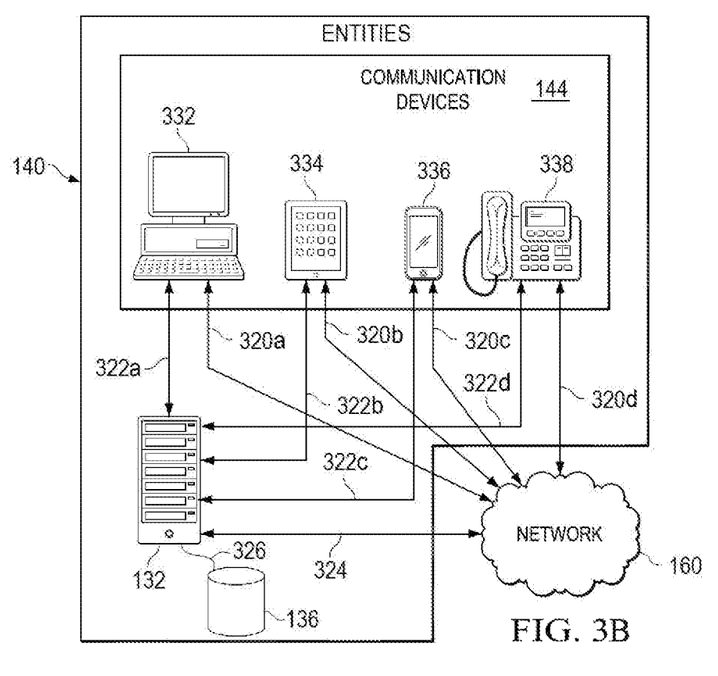

FIGS. 3A and 3B illustrate the communication devices of one or more entities 130 and one or more end user systems 120 of FIG. 1 in greater detail according to an embodiment. FIG. 3A illustrates one or more entities 130 of FIG. 1 in greater detail according to an embodiment. One or more entities 130 comprises server 132, communication devices 134, database 136, and/or communication links 310-316 which may be configured to communicate with network 160, platform interface 110, cloud datastore 120, and communication devices 144 of one or more end user systems 140. As discussed herein, communication devices 134 provide a channel of communication via communication links 310-316 to communication channels 150 between one or more entities 130 and one or more end user systems 140 via network 160.

In one embodiment, one or more communication devices 302-308 may each operate on separate computer systems or may operate on one or more shared computer systems. Each of these one or more computer systems may be a computer system 302, such as a work station, personal computer, network computer, laptop computer, notebook computer, tablet-type device 304, smartphone 306, terminal, or any other suitable communication device 124. In addition, communication devices 134 may comprise a land-line or VoIP telephone 308. According to embodiments each of the communication devices 134 are configured to communicate with communication devices 144 over a communication channel 150.

FIG. 3B illustrates one or more end user systems 140 of FIG. 1 in greater detail according to an embodiment. One or more end user systems 140 comprises server 142, communication devices 144, database 146, and/or communication links 320-326 which may be configured to communicate with network 160, platform interface 110, cloud datastore 120, and communication devices 144 of one or more entities 130. As discussed herein, communication devices 144 provide a channel of communication via communication links 310-316 to communication channels 150 between one or more end user systems 140 and one or more entities 130 via network 160.

In one embodiment, one or more communication devices 332-338 may each operate on separate computer systems or may operate on one or more shared computer systems. Each of these one or more computer systems may be a computer system 332, such as a work station, personal computer, network computer, laptop computer, notebook computer, tablet-type device 334, smartphone 336, terminal, or any other suitable communication device 144. In addition, communication devices 144 may comprise a land-line or VoIP telephone 338. According to embodiments each of the communication devices 144 are configured to communicate with communication devices 134 over a communication channel 150.

In addition, or as an alternative, computer systems 302 and 332, one or more tablet-type devices 304 and 334, smartphones 306 and 336, and land-line or VoIP telephones 308 and 338 may comprise a processor, memory and data storage. The processor may execute an operating system program stored in memory to control the overall operation of computer systems 302 and 332, one or more tablet-type devices 304 and 334 and/or smartphones 306 and 336. For example, the processor may control the reception of signals and the transmission of signals within system 100. The processor may execute other processes and programs resident in memory, such as, for example, registration, identification or communication over the communication channels and move data into or out of the memory, as required by an executing process.

Those skilled in the art will recognize that one or more specific examples of communication devices 302-308 and 332-338 are given by way of example and that for simplicity and clarity, only so much of the construction and operation of one or more communication devices 302-308 and 332-338 as is necessary for an understanding of the present invention is shown and described. Moreover, it is understood that one or more communication devices 302-308 and 332-338 should not be construed to limit the types of devices in which embodiments of the present invention may be implemented. For example, one or more communication devices 302-308 and 332-338 may be any device, including, but not limited to, conventional cellular or mobile telephones, smart mobile phones, an IPHONE™, an IPAD™, wireless tablet devices, paging devices, personal digital assistant devices, short message service (SMS) wireless devices, portable computers, or any other device capable of wireless or network communication.

According to embodiments, each of the one or more communication devices 302-308 and 332-338 may be assigned one or more identification numbers, such as IP addresses, serial numbers, or telephone numbers that may be used to identify communication devices 302-308 and 332-338. According to some embodiments, each communication device 302-308 and 332-338 is associated with an identification number, such as an IP or MAC address. In addition, or as an alternative, communication 302-308 and 332-338 may be local to or remote from one or more entities 120 and one or more end user systems 140. That is, communication devices 302-308 of one or more entities 120 may communicate with communication devices 332-338 of one or more end user systems 140. For example, platform interface 110 is programmed to monitor and analyze communication activity via communication channels, such as, for example, telephone calls, emails, instant, chat or text messaging, posting to social media, blogs, or newsgroups, and any other communication activity between communication devices 302-308 of one or more entities 120 and communication devices 332-338 of one or more end user systems 140.

That is, communication devices 134 of one or more entities 130 may communicate with communication devices 144 of one or more end user systems 140. For example, platform interface 110 is programmed to monitor and analyze communication activity via communication channels 150, such as, for example, telephone calls, emails, instant, chat or text messaging, posting to social media, blogs, or newsgroups, and any other communication activity of communication channels 150 and between communication devices 144 of one or more end user systems 140 and communication devices 134 of one or more entities 130. In addition, or as an alternative, platform interface 110 provides one or more end user systems 140 access to one or more cloud datastores 120 and/or one or more entities 130 in order to communicate over communication channels 150.

Figure 4:
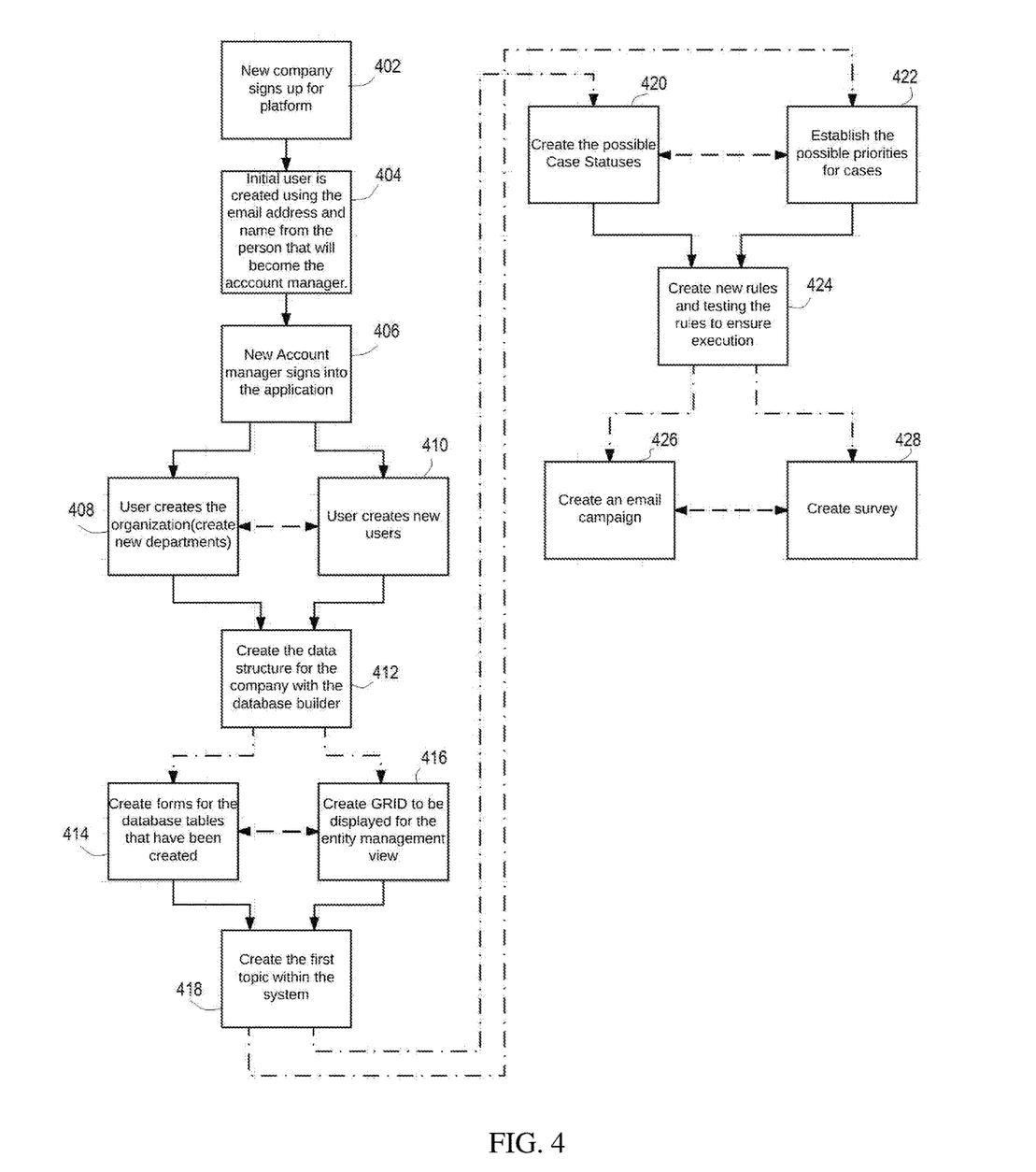
FIG. 4 illustrates an exemplary method according to an embodiment.

FIG. 4 illustrates an exemplary method 400, according to an embodiment. The process of method 400 proceeds by one or more activities, which although illustrated in a particular order may be performed in one or more permutations, according to particular needs.

Method 400 beings at activity 402 where an entity 130 communicates with platform interface 110. As discussed above, platform interface 110 is programmed to communicate and interact with cloud datastore 120, one or more entities 130 and one or more end user systems 140 and provide data integrity which allows full transparency between one or more entities 130 and one or more end user systems 140 to create a single view of customer account and relevant information. In addition, the entity 130 communicates with and receives communication from platform interface 110 using communication channels 150. These communication channels may be, for example, telephone calls, emails, instant, chat or text messaging, posting to social media, blogs, or newsgroups, and any other communication activity of communication channels 150.

At activity 404, platform interface 110 creates an initial user for an administrator of entity 130 using an email address and contact information. As discussed above, platform interface 110 provides for the creation and setup of different types of users and assigns multiple different types of permissions to those users based on their roles within one or more entities 130. For example, on the customer service side, user interface module 210 provides for multiple types of users such as, for example, account managers, support agents, sales agents, onboarding specialists, and the like. According to embodiments, the administrator of entity 130 will be the initial account manager.

At activity 406, the account manager of entity 130 logs into platform interface 110 as the account manager for entity 130. At activity 408, the account manager of entity 130 creates the organization and departments of entity 130 including the end user systems 140. In addition, the account manager i.e., administration users of entity 130 configures various views based on conditions of each audience within the entity 130, such as, for example, departments, teams, statuses or individuals. As discussed above, system 100 provides a shared communications platform system that allows full transparency between one or more entities 130 and one or more end user systems 140 to create a single view of the end user system 140 account and relevant information via cloud datastore 120. In addition, or as an alternative, the account manager sets up and determines processes around entities 130 corporate needs related to the interactions between the entity 130 and its customers using end user system 140 over various communication channels 150.

At activity 410 platform interface 110 creates multiple types of users for entity 130 and assigns multiple types of permissions to those users based on their roles in entity 130. At activity 412, the account manager sets up the database schema and tables as per the specific needs of entity 130, using database builder 248. For example, database builder 248 creates new database entities and/or tables, add/edit the fields in these database tables, and also add/edit relationships between multiple database tables. In addition, or as an alternative, database builder 248 allows the account manager to perform specific actions such as, for example, setting fields as unique or required, setting a field as a primary display field, and also being able to support all the common field types needed to represent the data such as number, text, currency, date, and the like. In addition, database builder 248 allows the account manager the ability to create relationships between different entities and/or tables. These relationships may be of multiple cardinalities such as a one to one (1:1) or many to one (M:1) or a many to many (M:M) relationship.

At activity 414, platform interface 110 creates the forms for the database tables created in activity 412 using database builder 248. As discussed above, administration interface 240 of platform interface 110 allows for forms to be created for specific conditions, such as, for example, departments. In addition, and at the time of the form creation, the account manager may pick and choose the conditions to be associated with the form, such as, for example, case departments. By doing this, this ensures that only people in those departments will see the form specific to their department. In addition, or as an alternative, the account manager may create multiple forms for entity 130, and each of the multiple forms may have different fields specific to the conditions they are being created for.

At activity 416, table builder 258 of platform interface 110 allows the account manager to configure a grid or list view or table view, which allows the administrator to select particular columns to be displayed for agents for that grid. In addition, and as discussed above, this enables the administrator to not only select the columns that are native to the entity for which the grid is being constructed but also enables selection of columns that represent relationships of this entity to other entities. For example, these may be single level or multi-level relationships, thus allowing the user to see relevant fields of related entities also at a glance in the grid of the primary entity.

At activity 418, platform interface 110 creates smart topics associated with entity 130. As discussed above, smart topics allow a user to create and configure topics, including assigning topic points and SLA times for cases associated with the topic. In addition, the smart topics provides a powerful suggestion tool for the agents. For example, every time a topic is created, the natural language processing engine of intelligence module 260 stores that topic and the relevant information. Thereafter, if a case is created that has similar information to the one previously created, platform interface 110 will automatically suggest topics for the user to be able to correctly represent the topic of a case.

Platform interface 110 allows the account manager of entity 130 to manage cases such as status at activity 420 and priority management at activity 422. As discussed above, form builder 250 and table builder 258 allows the account manager to configure various views based on conditions of each audience within entity 130, such as, for example, a status. In addition, or as an alternative, form builder 250 allows for the flexibility of platform interface 110 to design forms based on status such as, for example, active or non-active customers including pre-sale forms that provide status such as, for example, lead, quote, sales, account, or the like. The account manager may also specify the order of the priorities from highest to lowest and vice-versa.

At activity 424, the account manager of entity 130 uses rules engine 270 to setup business rules to automate tasks, take automatic action upon timed triggers being executed and also provide appropriate notifications. As discussed above, rules engine 270 provides a list of all the rules currently in system 100, the editing of triggers, conditions and actions, and shows the flow of the rule with the elements and branches as constructed by the account manager of entity 130. In addition, an action is the task that needs to be performed upon the successful completion of a condition or conditions. For example, a create/update action will result in entity 130 being created or updated based on the relevant conditions and a notification action that results in a notification being sent out upon the successful evaluation of a condition/conditions.

According to embodiments, user interface module 210 of platform interface 110 provides the account manager access to email marketing at activity 426 and surveys at activity 428. The email marketing provides the account manager several tools to design, create and send out emails over communication channels 150 pertaining to marketing campaigns of entity 130. In addition, the surveys provides the account manager the ability to design, create and manage surveys to obtain relevant feedback from one or more end user systems 140. In addition, and as discussed above, user interface module 210 provides for one or more macros that allow the account manager to automate and increase the efficiency of communication between the entity 130 and one or more end user systems 140. For example, the macros enable the account manager to pre-write and store templated questions and responses along with pre-set form field settings. Accordingly, these pre-set templates may be accessed to ensure responses to common requests are fast and consistent.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
a computer coupled with the one or more databases and configured to:
  process, by a natural language processing (NLP) engine, one or more communication activities from one or more monitored communication channels, the one or more communication activities occurring between a customer and an agent;
  identify one or more sentiments in the one or more communication activities;
  assign each of the one or more communication activities to a case;
  categorize each case according to one or more topics;
  store case data of at least one case categorized to each of the one or more topics;
  receive a new communication activity from the one or more monitored communication channels;
  determine the new communication activity is not an interaction of a previous case;
  assign the new communication activity to a new case; and
  predict one or more topics for the new case by selecting at least one topic of the one or more topics based, at least in part, on the stored case data of at least one case categorized to each of the one or more topics, the stored case data having a similarity to case data of the new case greater than a predetermined threshold.

2. The system of claim 1, wherein the computer is further configured to:
assign a quantity of topic points and a service level agreement time to one or more smart topics of the one or more topics; and
in response to assigning one or more smart topics to the new case, assign the quantity of topic points and the service level agreement time to the new case.

3. The system of claim 1, wherein the computer is further configured to:
store one or more macros comprising form field settings and predefined text and associated with one or more template questions and one or more template responses;
determine the new communication activity comprises a request equivalent to a template question of the one or more template questions;
in response to determining the new communication activity comprises a request equivalent to the template question of the one or more template questions, trigger a rule that executes the macro comprising the equivalent template question; and
generate a communication based, at least in part, on the macro executed by the triggered rule and comprising a response equivalent to the template response using the form field settings and the predefined text from the executed macro.

4. The system of claim 1, wherein the one or more communication channels comprises one or more of:
a telephone call;
an email;
an instant message;
a chat message;
a text message;
a posting on social media;
a blog; and
a newsgroup.

5. The system of claim 1, wherein the computer is further configured to:
identify, using the NLP engine, keywords of the one or more communication activities and the new communication activity from the one or more monitored communication channels, each of the one or more communication activities and the new communication activity associated with one or more entities;
determine a sentiment for the one or more entities associated with the new communication activity based, at least in part, on the keywords identified by the NLP engine for the one or more communication activities and the new communication activity; and
display, by a user interface, the sentiment and one or more account experience scores for the one or more entities associated with the new communication activity.

6. The system of claim 5, wherein the computer is further configured to:
quantify the identified keywords of the one or more communication activities according to the associated entities; and
generate a report comprising the quantity of the identified keywords associated with each of the associated entities.

7. The system of claim 5, wherein the one or more entities comprises one or more of:

a department;
a call group;
a user;
a location;
an agent;
an employee role; and
a telephone number.

8. A computer-implemented method, comprising:
processing, by a natural language processing (NLP) engine, one or more communication activities from one or more monitored communication channels, the one or more communication activities occurring between a customer and an agent;
identifying, by a computer comprising a processor and memory, one or more sentiments in the one or more communication activities;
assigning, by the computer, each of the one or more communication activities to a case;
categorizing, by the computer, each case according to one or more topics;
storing, by the computer, case data of at least one case categorized to each of the one or more topics;
receiving, by the computer, a new communication activity from the one or more monitored communication channels;
determining, by the computer, the new communication activity is not an interaction of a previous case;
assigning, by the computer, the new communication activity to a new case; and
predicting, by the computer, one or more topics for the new case by selecting at least one topic of the one or more topics based, at least in part, on the stored case data of at least one case categorized to each of the one or more topics, the stored case data having a similarity to case data of the new case greater than a predetermined threshold.

9. The computer-implemented method of claim 8, further comprising:
assigning, by the computer, a quantity of topic points and a service level agreement time to one or more smart topics of the one or more topics; and
in response to assigning one or more smart topics to the new case, assigning, by the computer, the quantity of topic points and the service level agreement time to the new case.

10. The computer-implemented method of claim 8, further comprising:
storing, by the computer, one or more macros comprising form field settings and predefined text and associated with one or more template questions and one or more template responses;
determining, by the computer, the new communication activity comprises a request equivalent to a template question of the one or more template questions;
in response to determining the new communication activity comprises a request equivalent to the template question of the one or more template questions, triggering, by the computer, a rule that executes the macro comprising the equivalent template question; and
generating, by the computer, a communication based, at least in part, on the macro executed by the triggered rule and comprising a response equivalent to the template response using the form field settings and the predefined text from the executed macro.

11. The computer-implemented method of claim 8, wherein the one or more communication channels comprises one or more of:

a telephone call;
an email;
an instant message;
a chat message;
a text message;
a posting on social media;
a blog; and
a newsgroup.

12. The computer-implemented method of claim 8, further comprising:
identifying, using the NLP engine, keywords of the one or more communication activities and the new communication activity from the one or more monitored communication channels, each of the one or more communication activities and the new communication activity associated with one or more entities;
determining, by the computer, a sentiment for the one or more entities associated with the new communication activity based, at least in part, on the keywords identified by the NLP engine for the one or more communication activities and the new communication activity; and
displaying, by a user interface, the sentiment and one or more account experience scores for the one or more entities associated with the new communication activity.

13. The computer-implemented method of claim 12, further comprising:
quantifying, by the computer, the identified keywords of the one or more communication activities according to the associated entities; and
generating, by the computer, a report comprising the quantity of the identified keywords associated with each of the associated entities.

14. The computer-implemented method of claim 12, wherein the one or more entities comprises one or more of:
a department;
a call group;
a user;
a location;
an agent;
an employee role; and
a telephone number.

15. A non-transitory computer-readable medium embodied with software, the software when executed:
processes, by a natural language processing (NLP) engine, one or more communication activities from one or more monitored communication channels, the one or more communication activities occurring between a customer and an agent;
identifies one or more sentiments in the one or more communication activities;
assigns each of the one or more communication activities to a case;
categorizes each case according to one or more topics;
stores case data of at least one case categorized to each of the one or more topics;
receives a new communication activity from the one or more monitored communication channels;
determines the new communication activity is not an interaction of a previous case;
assigns the new communication activity to a new case; and
predicts one or more topics for the new case by selecting at least one topic of the one or more topics based, at least in part, on the stored case data of at least one case categorized to each of the one or more topics, the stored case data having a similarity to case data of the new case greater than a predetermined threshold.

16. The non-transitory computer-readable medium of claim 15, wherein the software when executed further:
assigns a quantity of topic points and a service level agreement time to one or more smart topics of the one or more topics; and
in response to assigning one or more smart topics to the new case, assigns the quantity of topic points and the service level agreement time to the new case.

17. The non-transitory computer-readable medium of claim 15, wherein the software when executed further:
stores one or more macros comprising form field settings and predefined text and associated with one or more template questions and one or more template responses;
determines the new communication activity comprises a request equivalent to a template question of the one or more template questions;
in response to determining the new communication activity comprises a request equivalent to the template question of the one or more template questions, triggers a rule that executes the macro comprising the equivalent template question; and
generates a communication based, at least in part, on the macro executed by the triggered rule and comprising a response equivalent to the template response using the form field settings and the predefined text from the executed macro.

18. The non-transitory computer-readable medium of claim 15, wherein the one or more communication channels comprises one or more of:
a telephone call;
an email;
an instant message;
a chat message;
a text message;
a posting on social media;
a blog; and
a newsgroup.

19. The non-transitory computer-readable medium of claim 15, wherein the software when executed further:
identifies, using the NLP engine, keywords of the one or more communication activities and the new communication activity from the one or more monitored communication channels, each of the one or more communication activities and the new communication activity associated with one or more entities;
determines a sentiment for the one or more entities associated with the new communication activity based, at least in part, on the keywords identified by the NLP engine for the one or more communication activities and the new communication activity; and
displays, by a user interface, the sentiment and one or more account experience scores for the one or more entities associated with the new communication activity.

20. The non-transitory computer-readable medium of claim 19, wherein the software when executed further:
quantifies the identified keywords of the one or more communication activities according to the associated entities; and
generates a report comprising the quantity of the identified keywords associated with each of the associated entities.

* * * * *